US011625888B2

(12) United States Patent
Leonardi (10) Patent No.: US 11,625,888 B2
(45) Date of Patent: Apr. 11, 2023

(54) METHODS AND APPARATUS FOR MODIFYING A BOUNDING VOLUME HIERARCHY FOR RAYTRACING

(71) Applicant: Sony Interactive Entertainment Inc., Tokyo (JP)

(72) Inventor: Rosario Leonardi, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 175 days.

(21) Appl. No.: 16/952,286

(22) Filed: Nov. 19, 2020

(65) Prior Publication Data

US 2021/0166462 A1 Jun. 3, 2021

(30) Foreign Application Priority Data

Nov. 29, 2019 (GB) ...................................... 1917425

(51) Int. Cl.
*G06T 15/06* (2011.01)
(52) U.S. Cl.
CPC .................................. *G06T 15/06* (2013.01)
(58) Field of Classification Search
CPC .. G06T 1/60; G06T 1/20; G06T 15/40; G06T 2200/28; G06F 12/0802; G06F 2212/302; G09G 5/39
See application file for complete search history.

(56) References Cited

U.S. PATENT DOCUMENTS

| 2009/0189898 | A1* | 7/2009 | Dammertz | G06T 15/55 |
| | | | | 345/426 |
| 2016/0071312 | A1* | 3/2016 | Laine | G06T 15/08 |
| | | | | 345/419 |
| 2018/0225844 | A1* | 8/2018 | Higgs | G06T 9/40 |
| 2019/0057539 | A1* | 2/2019 | Stanard | G06T 17/005 |
| 2019/0156550 | A1* | 5/2019 | Stanard | G06T 15/50 |
| 2019/0197761 | A1 | 6/2019 | Saleh | |
| 2019/0318445 | A1* | 10/2019 | Benthin | G06T 1/20 |
| 2019/0318530 | A1* | 10/2019 | Hunt | G06T 15/06 |

OTHER PUBLICATIONS

Combined Search and Examination Report for corresponding GB Application No. GB1917425.9, 5 pages, dated Apr. 23, 2020.
Brian Smits, "Efficiency Issues for Ray Tracing" University of Utah, Journal of Graphics Tools, vol. 3, No. 2, pp. 1-12, http://www.cse.chalmers.se/edu/year/2017/course/TDA362/EfficiencyIssuesForRayTracing.pdf., Feb. 19, 1999.

* cited by examiner

*Primary Examiner* — Phuc N Doan
(74) *Attorney, Agent, or Firm* — Matthew B. Dernier, Esq.

(57) ABSTRACT

A system for performing a raytracing process, the system comprising a bounding volume hierarchy, BVH, identification unit operable to identify a BVH structure for use in generating images of a virtual environment, the BVH structure comprising information about one or more surfaces within the virtual environment, a BVH selection unit operable to discard one or more elements of the BVH structure in dependence upon a direction of an incident ray, and a raytracing unit operable to perform a raytracing process using the remaining BVH elements.

10 Claims, 7 Drawing Sheets

METHODS AND APPARATUS FOR MODIFYING A BOUNDING VOLUME HIERARCHY FOR RAYTRACING

BACKGROUND OF THE INVENTION

Field of the Invention

This disclosure relates to an image generation system and method.

DESCRIPTION OF THE PRIOR ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Raytracing is a rendering technique that has received widespread interest in recent years for its ability to generate a high degree of visual realism. Raytracing is often utilised in simulations of a number of optical effects within an image, such as reflections, shadows, and chromatic aberrations.

This can be useful for any computer-based image generation process—for example, for special effects in movies and in generating images for computer games. While such techniques have been discussed and used for a relatively long time, it is only more recently that processing hardware has become suitably powerful so as to be able to implement raytracing techniques with an acceptably low latency for real-time applications or at least more extensive use within a piece of content.

Such techniques effectively aim to determine the visual properties of objects within a scene by tracing, from the camera, a ray for each pixel in the scene. Of course, this is a rather computationally intensive process—a large number of pixels are expected to be used for displaying a scene, and this may lead to a large number of calculations even for simpler scenes (such as those with few reflections and the like). In view of this, scanline rendering and other rendering methods have generally been preferred for rendering where the latency is considered to be important despite the lower image quality.

One technique that seeks to improve the rendering times associated with raytracing based methods is the use of bounding volumes to represent groups of objects. The use of bounding volumes is advantageous in that a group of objects may be tested for intersections by rays together, rather than on a per-object basis. This can mean that the number of intersection tests is reduced, as well as the calculations for each being simplified by the use of a simplified shape (such as a box or sphere) that is representative of the objects. While in principle advantageous, however, the challenge of defining an appropriate bounding volume structure may be problematic.

Raytracing, as a technique that can increase the perceived realism of generated video content, is of particular interest for virtual reality (VR) applications. In such applications, it is of course desirable to increase the realism of the provided visuals so as to improve the sense of immersion that is experienced by a viewer of the content—such as the user of a head-mountable display device (HMD). However, VR applications are particularly sensitive to long rendering times and as a result raytracing techniques are not widely used in these contexts.

It is therefore desirable to implement a raytracing algorithm in a manner that allows a realistic image to be generated without increasing the latency of the image rendering process to an undesirable level.

It is in the context of the above problems that the present disclosure arises.

SUMMARY OF THE INVENTION

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

The present disclosure relates to a system and method by which a bounding volume hierarchy (BVH) is used to generate information about the ability of an object to move through and environment. This differs from the traditional use of BVHs, in which they are used to represent objects in an ordered manner so as to enable raytracing (that is, graphics rendering) techniques to be performed more efficiently.

Figure 1:
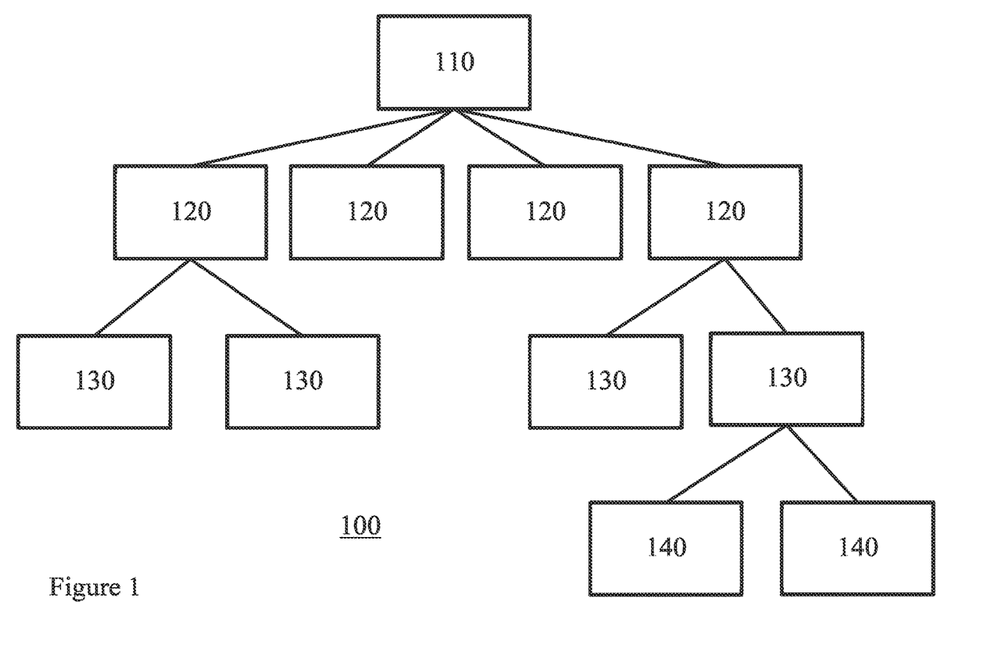
FIG. 1 schematically illustrates a bounding volume hierarchy.

FIG. 1 schematically illustrates a simple example of a BVH; in this example, each box (bounding volume) represents one or more objects at a given level of detail. Each of the boxes is included in the box above it in the hierarchy—for example, the box 110 comprises information about all of objects in the environment, while each of the boxes 120 comprise a subset of the objects. These subsets may be determined in any suitable manner, although it is often considered that methods by which objects that are close to each other within an environment are grouped together and represented by the same bounding volume are preferable.

The level of detail for each level can be determined in any suitable fashion, and the BVH may have a maximum level of detail that is defined. For example, the BVH may terminate with bounding volumes representing groups of objects—this would lead to a coarse representation, but one that is reduced in size and may be traversed very quickly. Alternatively, the BVH may terminate with bounding volumes representing portions of objects—while this offers a finer approximation of the objects, of course this provides a BVH that is larger and may take longer to traverse. The BVH may be defined so as to comprise elements of both—such that some objects have a finer/coarser representation than others.

BVHs can be generated in a number of ways, each with its own benefits and drawbacks. For example, a top-down approach can be taken in which the bounding volumes are defined beginning with the largest sets possible. That is, the input (such as the set of objects within an environment, or a representation of those objects) is divided into two or more subsets that are each then subdivided—that is, bounding volumes are generated beginning with box 110, and proceeding to boxes 120 and so on. While this represents a fast implementation, it often results in a BVH that is rather inefficient, which can result in a larger size overall or a reduced ease of navigation.

An alternative method is that of the bottom-up approach. In this approach, the bounding volumes are defined beginning with the smallest volumes in the BVH. In the example of FIG. 1, this would mean that bounding volumes 140 are defined first, before progressing upwards to bounding volumes 130. While this can generally produce better (that is, more efficient) BVHs than the top-down approach, it can be more challenging to implement in an effective manner.

Each of these methods require information about all of the objects to be available before the BVH can be generated; this is of course acceptable in many applications, but in others it may be preferred that a BVH is able to be generated on-the-fly.

A third approach that may be considered is that of insertion methods. These may be performed on-the-fly, and they are performed by inserting objects into the bounding volumes of a BVH on a per-object basis. This means that only information about that object is necessary at the time of insertion. Insertion approaches cover a wide range of related methods in which the placement of the object is determined in a manner that identifies an optimal or suitable placement. For example, a function may be defined that evaluates the impact (in terms of size or navigability or the like) of an insertion upon the BVH, with the insertion being performed in a manner that minimises or otherwise reduces the impact upon the BVH.

Of course, any other suitable approaches may be considered compatible with the teachings of the present disclosure, rather than being limited to those discussed above.

Any suitable input data may be represented using a BVH and associated bounding volumes. For example, video games may provide a suitable source of input data for generating such a structure—in this case, the input information may be data about the virtual objects that defines their respective dimensions and locations. Similarly, information describing a real environment could be used as an information source—for example, information may be generated from images of a real environment and the objects within the environment, and this information can be used to generate a BVH that may be used to render images of that environment.

Figure 2:
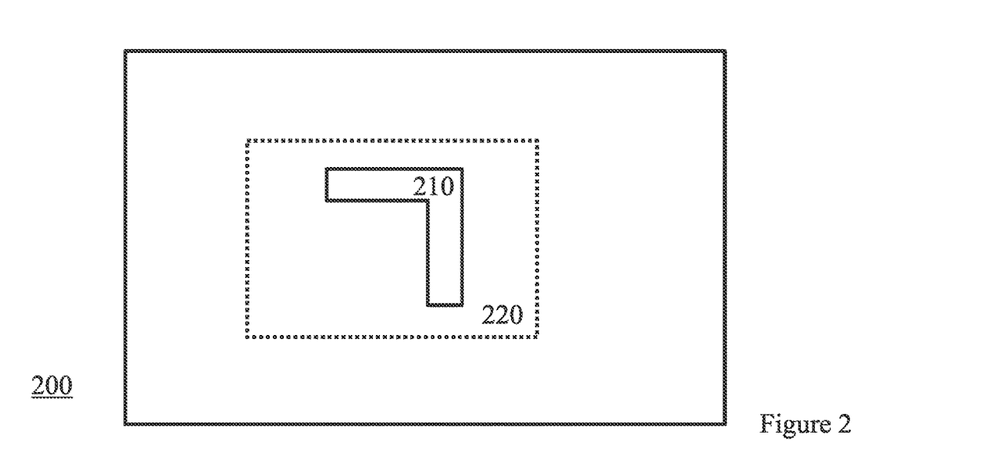
FIG. 2 schematically illustrates a bounding volume.
Figure 3:
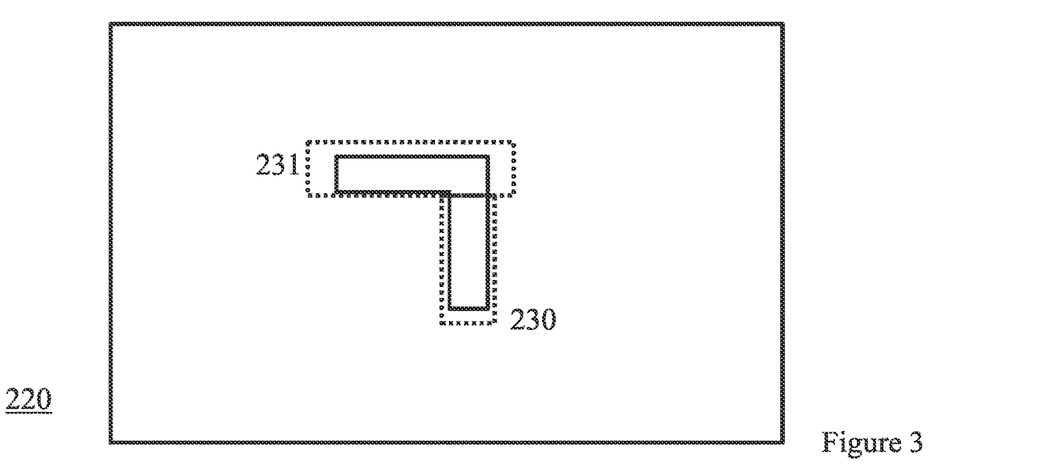
FIG. 3 schematically illustrates a plurality of bounding volumes.

FIGS. 2 and 3 schematically illustrate the use of bounding volumes in raytracing algorithms.

FIG. 2 schematically illustrates a viewport 200 in which rays are to be traced—this can be a camera view within a virtual environment to be presented to a viewer, for example. The scene comprises an object 210, which is enclosed by a bounding volume 220. Rather than testing intersections for each ray with each of the polygons that make up the object 210, which could be a rather large number, intersections are only tested with respect to the bounding volume 220. Of course, any rays that do not intersect the bounding volume 220 will not intersect the polygons that form the object 210—although of course rays may intersect the bounding volume 220 that will not intersect the polygons forming the object 210.

For example, if one hundred rays were to be tested for intersections, only one hundred tests would be required at this stage as there is a single object (the bounding volume 220) to test for each ray—rather than one hundred multiplied by the number of polygons making up the object 210.

FIG. 3 shows an enlarged version of the bounding volume 220, with smaller bounding volumes 230 and 231 used to represent the object 210. Intersections of the bounding volumes 230 and 231 can be tested for each of the rays that were found to intersect the bounding volume 220, to obtain a finer approximation of the visual appearance of the object 210.

If, for example, it were found that only ten rays intersected the bounding volume 220, this stage would require thirty tests (that is, a test for each ray with each bounding volume). This is again a very small amount relative to the testing of one hundred multiplied by the number of polygons making up the object 210 as noted above. It is therefore apparent that the falling number of rays to be considered for intersection is sufficient to offset the increasing number of bounding volumes to be considered, such that overall the total number of intersections to be tested is lower than the amount required if no bounding volumes are defined and no BVH is utilised.

In a practical implementation these volumes may be divided further until the surfaces of the object 210 are represented with a suitable level of precision for the application—such as when the bounding volumes and the polygons (primitives) representing the object occupy a similar display area, at which point the polygons may be used instead.

In these examples, the bounding volume 220 may be considered to be a higher level in the BVH than the bounding volumes 230, 231—for instance, the bounding volume 220 may correspond to a volume such as 120 of FIG. 1, while the smaller bounding volumes 230, 231 may correspond to volumes such as 130 of FIG. 1.

It is apparent from these Figures that the number of calculations that are to be performed in a raytracing method may be reduced significantly with the use of bounding volumes and BVHs; this is because the number of intersections that are to be evaluated may be reduced significantly.

The efficiency of such a process may be increased further by defining BVHs in a more suitable manner. In the present discussion, this refers to a BVH structure that enables faster or more efficient traversal rather than necessarily any property of the BVH structure itself. In embodiments of the present disclosure, the BVH structure is defined so as to support a directional dependence to enable an improved traversal.

Figure 4:
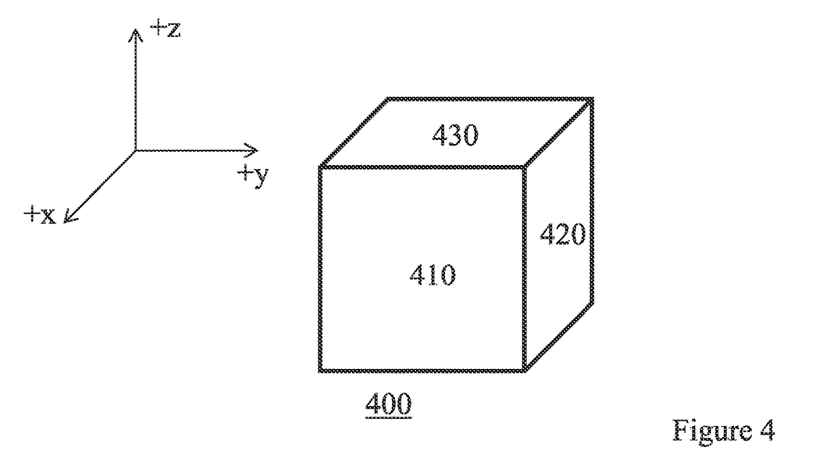
FIG. 4 schematically illustrates a cube in three-dimensional space.

FIG. 4 schematically illustrates a cube in three-dimensional space; each of the faces is aligned (in the positive or negative direction) with a respective axis in the Cartesian coordinate system as shown. That is, the cube 400 has a first face 410 which is aligned in the positive x-direction (with a corresponding face on the opposite side of the cube which is aligned in the negative x-direction), a second face 420 aligned in the positive y-direction (with a corresponding face on the opposite side of the cube which is aligned in the negative y-direction), and a third face 430 aligned in the positive z-direction (with a corresponding face on the opposite side of the cube which is aligned in the negative z-direction).

In view of this, it is considered that by comparing the orientation of a surface of an object to one of the faces 410, 420, 430 (or their opposite faces), it is possible to identify a primary or dominant direction of the surface. That is, each of the surfaces of an object is able to be approximated (or otherwise represented) by one of the faces of the cube 400 by determining which of the faces has the most similar direction. This can be determined by comparing surface normals, for example, or by identifying a direction from associated metadata or the like.

Figure 5:
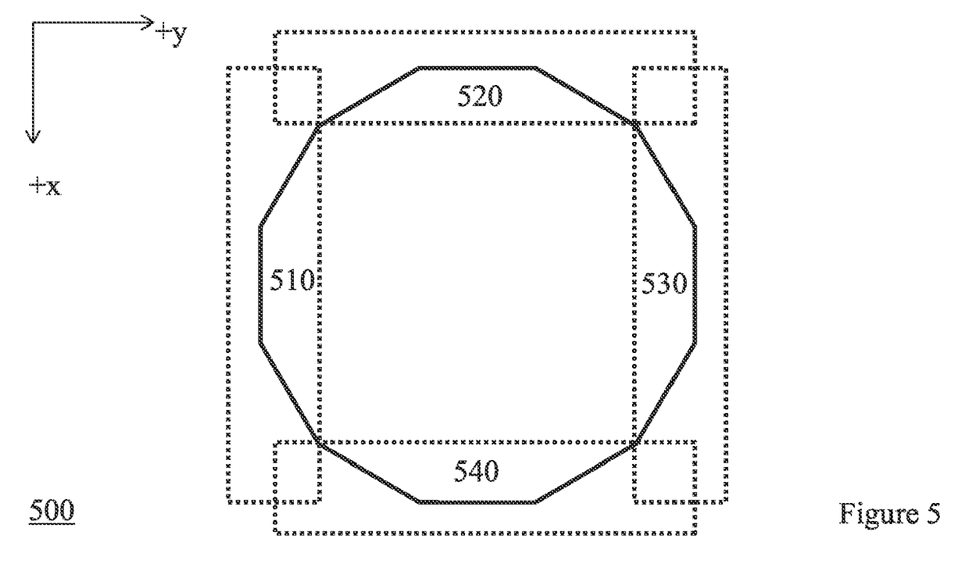
FIG. 5 schematically illustrates a two-dimensional grouping.

FIG. 5 schematically illustrates a two-dimensional example of the mapping of an object's surfaces to corresponding groups to be used for the, in line with the above discussion. This Figure shows a dodecagon 500 with each of its sides assigned to one of four groups 510, 520, 530, 540. Each of these groups corresponds to one of the faces as shown in FIG. 4—for example, the group 540 corresponds to the face 410, while the group 530 corresponds to the face 420.

As is apparent from the Figure, the sides of the shape 500 are assigned to these groups in dependence upon the direction in which the sides are oriented. For instance, it is clear that each of the surfaces in the group 530 has an orientation that is substantially in the +y direction—that is, the y-component of the normal vector for that face would have the greatest magnitude relative to the other components.

Of course, the same process may be considered appropriate in three dimensions—the two-dimensional case is considered here for clarity. In the three-dimensional case, the same analysis is applied (that is, an analysis to determine the orientation of the surface) with a consideration to the z-component as well as the x- and y-components. Of course, any suitable coordinate system may be used—there is no requirement for Cartesian coordinates to form the basis of this process.

By implementing such a grouping of surfaces based upon their orientation, it becomes possible to generate BVH structures in dependence upon surface orientation within a virtual environment by using those groups. This is advantageous in that the generated BVH structure can be selectively traversed based upon information about the direction of the rays used for raytracing relative to the orientation of the surfaces of an object being rendered. The processing cost of traversing a BVH is proportional to the logarithm of the number of nodes; therefore by providing a number of smaller BVHs based upon directionality the cost of traversing each BVH is reduced. In general, this reduction is sufficient to at least offset the increase in processing cost associated with the traversal of multiple BVHs.

The below discussion refers to individual BVHs corresponding to each group, however this should not be considered limiting; further discussion relating to BVH structures is provided below.

Figure 6:
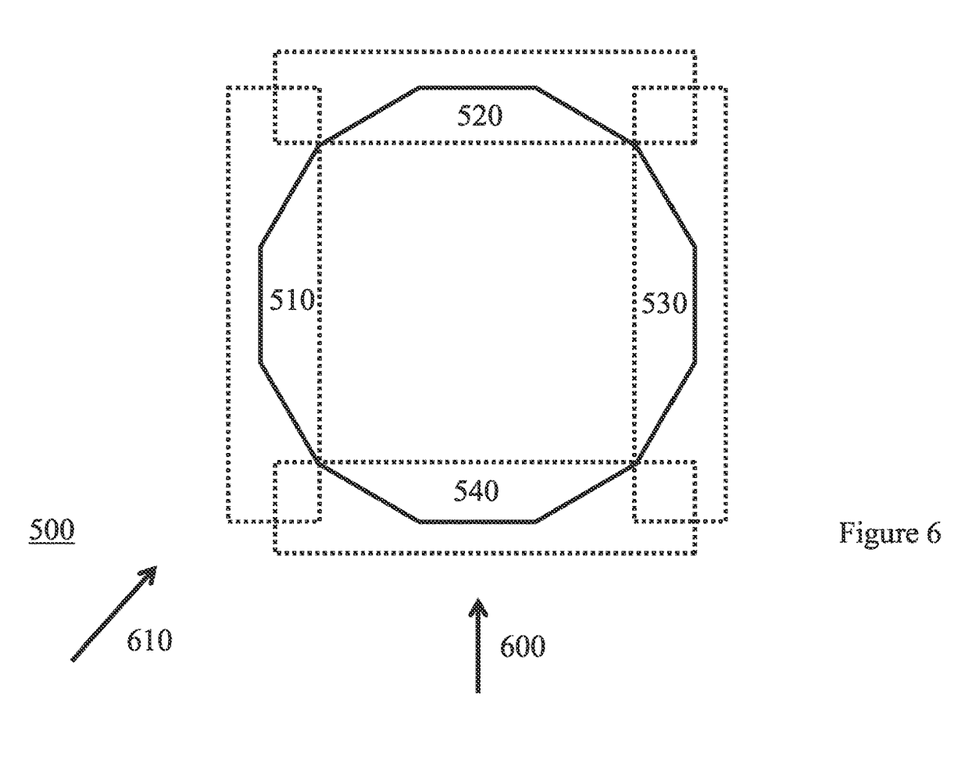
FIG. 6 schematically illustrates the grouping of FIG. 5 with incident rays.

For example, consider the rendering of the object 500 of FIG. 5. FIG. 6 illustrates a pair of incident rays 600 and 610, which may be associated with different virtual camera positions in the virtual environment comprising the object 500. These rays may be indicative of the general direction of the virtual camera, or multiple rays may be considered when making a determination about which BVHs are of interest in the raytracing process. Of course, the determination may be performed in a dynamic fashion in recognition of the fact that the raytracing process may be performed continuously (or repeatedly) during an image rendering process—that is, the determination may be the determination of which portion of the BVH structure is to be used for that specific raytracing process.

The ray 600 is incident in a perpendicular direction to the group 540, and as such the BVH corresponding to the group 540 may be considered to be essential for the raytracing process—this group of surfaces will certainly be visible, in the absence of any occlusion or the like. The BVHs corresponding to the groups 510 and 530 may be considered useful—it is apparent that at least some of the surfaces in each of these groups will be visible to the ray 600. However, the BVHs for these groups could be omitted in some embodiments so as to provide a faster or less expensive raytracing process as the impact may be reduced due to the relative orientation.

Of course, the final group 520 is entirely obscured in such an example—any surfaces which face in the same direction (or at least substantially in the same direction) as a ray will not directly interact with that ray. It is therefore considered that the BVH corresponding to the group 520 may be omitted entirely without significant impact on the raytracing processing—this therefore simplifies the traversal process associated with that raytracing.

Turning to the ray 610, it is clear that this comprises both a negative x- and a positive y-component to its direction. This means that the ray 610 is incident upon surfaces in both groups 510 and 540, as each of these groups comprises surfaces with a normal vector that possesses a component that differs in at least one sign with that of the incident ray 610 (that is, each of the surfaces in these groups has a normal with one or both of a positive x-component and a negative y-component). While not every surface in these groups may be intersected by the ray 610, it is sufficient that at least a portion of them are.

It is further apparent from FIG. 6 that the ray 610 is not directly incident upon any of the surfaces in the groups 520 or 530. Each of the BVHs corresponding to these groups may therefore be omitted, meaning that a BVH traversal associated with the ray 610 need only traverse the BVHs corresponding to groups 510 and 540.

These are merely exemplary configurations, of course, intended to demonstrate the general principles of a direction-based traversal of a BVH structure. Numerous modifications and variations are discussed below, and would be apparent to the skilled person upon reading this disclosure.

Figure 7:
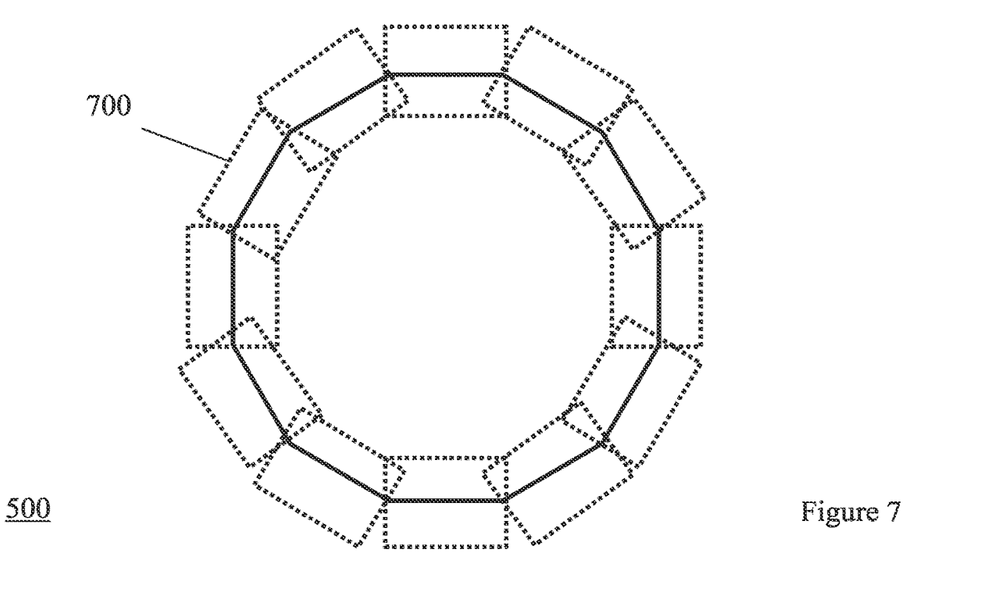
FIG. 7 schematically illustrates an alternative two-dimensional grouping.

For instance, while the above discussion has been limited to that of cube surfaces aligned with the three Cartesian coordinate axes, this is not an essential feature. FIG. 7 schematically illustrates such a modification in the context of the example of FIGS. 5 and 6, in which the number of groups is increased.

In the example of FIG. 7, twelve groups 700 are defined (each corresponding to one of twelve directions or surface orientations) rather than the four groups 510, 520, 530, 540. Of course, this number is purely exemplary, and the teachings may be extended to any number of groups as appropriate (and also extended into three dimensions, as discussed above), including both higher and lower numbers of groups.

It will be appreciated that when using a greater number of groups, the size of the BVH corresponding to each group will be reduced. This can reduce the traversal time for each of the BVHs further, and also enable the discarding (or non-traversal) of a greater number of BVHs based upon the directional considerations.

For example, if the ray 600 were incident on the shape of FIG. 7 with the updated grouping configuration, it may be considered that only five groups 700 are intersected by the ray 600 (the bottom group, and the two groups each side of the bottom group). This is a smaller proportion of the defined groups than in the example of FIG. 6 (42% versus 75%), and as such may represent an overall decrease in processing cost as the total number of nodes to be traversed will be lower in line with this.

While described using regular shapes above, the grouping may be performed based upon the orientation of surfaces of shapes that are instead irregular. For example, an analysis of a virtual environment (or a real environment that is captured to generate a corresponding virtual environment) to determine the relative proportions of surface orientations within the environment may be performed. The determination of how to group the surfaces within the environment may be made in dependence upon this analysis. For example, in an environment in which many objects are unable to be viewed from certain directions (for instance, due to being mounted upon a wall) a more irregular grouping may be considered—for instance, the group 520 of FIG. 5 may be defined (as coinciding with the back of the wall-mounted objects) with groups 510, 530, and 540 being replaced by corresponding groups 700.

Once the grouping of the surfaces has been performed, the BVHs should be generated in dependence upon this grouping. Of course, the BVH structure may vary—this may be in dependence upon the specific application, particular environments or object configurations, or personal preference or the like. The following discussion provides examples of some possible BVH structures that may be considered, in the context of a BVH grouping based upon the faces of a cube as described with reference to FIG. 4.

Figure 8:
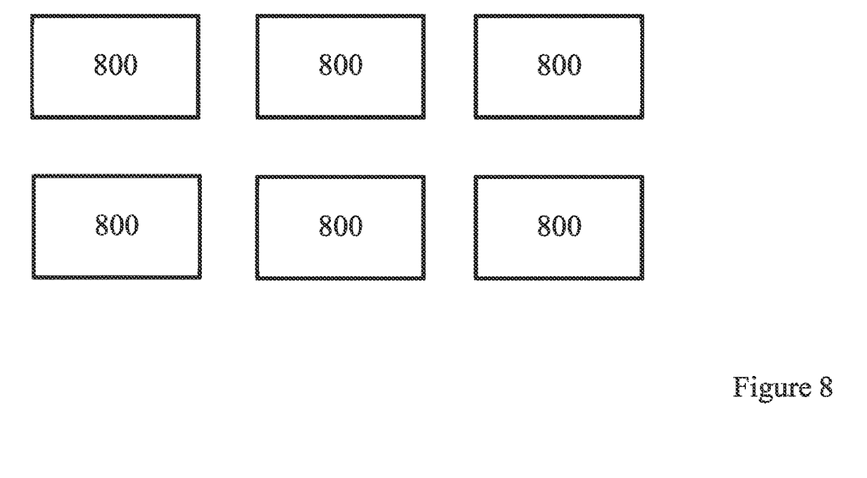
FIG. 8 schematically illustrates an exemplary BVH structure in which a plurality of unrelated BVHs is provided.

FIG. 8 schematically illustrates an exemplary BVH structure in which a plurality of unrelated BVHs 800 is provided. In this case, six BVHs 800 are provided, one corresponding to each face of the cube of FIG. 4. When utilising the BVH structure the BVHs 800 that are to be used may be selected independently, based upon the directional information associated with the BVHs and the incident ray or rays.

Figure 9:
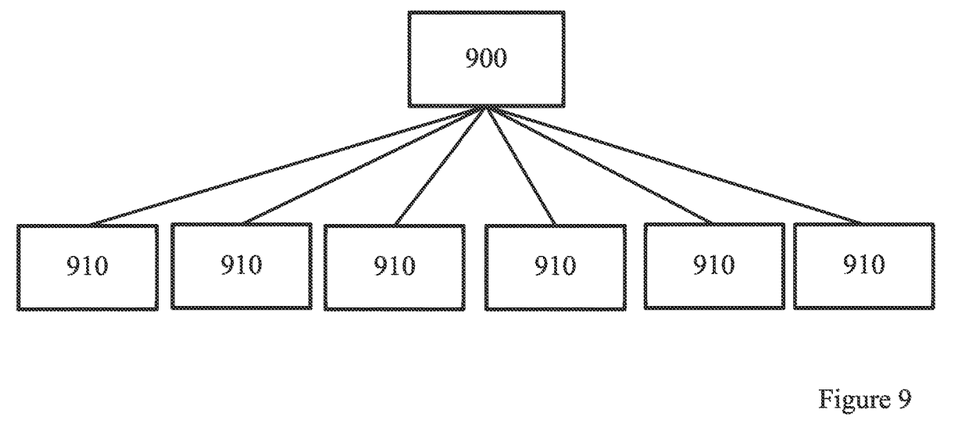
FIG. 9 schematically illustrates an exemplary BVH structure in which a single BVH is provided.

FIG. 9 schematically illustrates an exemplary BVH structure in which a single BVH 900 is provided with a number of high-level nodes 910 that each represents a branch of the BVH corresponding to a specific surface orientation. For example, each of the BVH nodes 910 may each correspond to a surface orientation approximated by the faces of the cube of FIG. 4. In such a structure, the nodes 910 may be selectively traversed based upon the orientation information.

Figure 10:
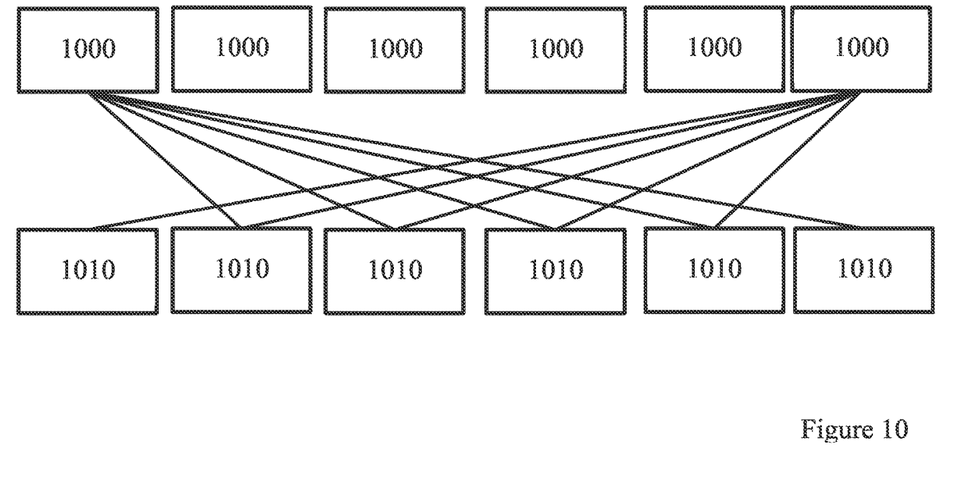
FIG. 10 schematically illustrates an exemplary BVH structure in which a plurality of related BVHs is provided.

FIG. 10 schematically illustrates an exemplary BVH structure in which a plurality of BVHs 1000 is provided, each being associated with a subset of the nodes 1010. In this example, associations are shown for two of the BVHs 1000 to preserve the clarity of the Figure. Specifically, the BVHs 1000 are each associated with a different set of five nodes 1010—and as such each BVH 1000 omits BVH data relating to a particular direction. Of course, BVHs 1000 may be defined so as to be associated with any suitable number of nodes 1010 so as to provide an effective BVH structure. For example, each of the BVHs 1000 could instead be associated with pairs of nodes 1010 (rather than five), and multiple BVHs 1000 could be selected rather than just one.

Such an arrangement may be advantageous in that the data storage requirements are reduced relative to storing multiple BVHs, without requiring a traversal in which nodes are required to be ignored as when using a single BVH as in FIG. 9.

The determination of which BVHs are to be used may be determined in any suitable manner. A first example, as discussed above, is that of considering whether a surface normal shares a vector direction in one or more coordinate directions. Another example is that of a determination which considers the sign of each of the vector components (the x, y, and z coordinates, in embodiments in which Cartesian coordinates are used) for one or more incident rays, and to input those vectors into the following equation:

$$BVH\_index = \text{sign}(direction.x) + 2*\text{sign}(direction.y) + 4*\text{sign}(direction.z)$$

By taking the value of sign( ) as being one when the vector has a positive component in the given direction and zero when it has a negative direction, this equation defines eight unique BVH indices in dependence upon the direction of the incident ray. By associating a BVH or some configuration of the BVH structure (such as a selection of which nodes to utilise) with each of these BVH indices, it is possible to select an appropriate set of BVH information to use for performing raytracing based upon directional information. Of course, a similar equation may be used independent of the number of indices required, with the variables updated to enable the determination of the different number of indices.

Alternatively, or in addition, further calculations may be used to identify BVH groups within a particular group identified by a BVH index as calculated above. For instance, it may be determined whether the value of each vector component is greater than or equal to a particular threshold and whether this varies the BVHs that may be required for raytracing. For example, using the rays 600 and 610 of FIG. 6, the ray 600 may be considered to have a positive y-component (as it is zero) or a similar ray with a very small y-component could be defined. This would result in an identification of the same BVH index using the equation above, and yet the ray 600 is more likely to intersect surfaces in the group 530. It may therefore be advantageous to identify such different cases within each index.

Figure 11:
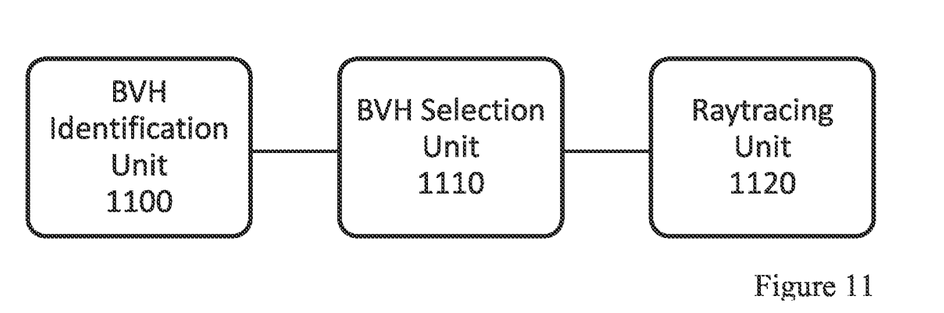
FIG. 11 schematically illustrates a system for performing a raytracing process.

FIG. 11 schematically illustrates a system for performing a raytracing process. This system comprises a BVH identification unit 1100, a BVH selection unit 1110, and a raytracing unit 1120. Such a system may be incorporated in a graphics processing unit, for example, or any suitable processing device such as a computer or a games console.

The BVH identification unit 1100 is operable to identify a BVH structure for use in generating images of a virtual environment, the BVH structure comprising information about one or more surfaces within the virtual environment. This may comprise the receiving of a BVH structure, such as by reading a hard drive or receiving a transmission through a network, and the determination of the structure of the BVH. For example, this may comprise identifying the grouping that is used (such as the number of groups, and the directional dependence of those groups), as well as how the BVH structure is configured (such as selecting from among the configurations discussed with reference to FIGS. 8-10 or any other suitable configurations).

Reference to information about one or more surfaces within the virtual environment may be taken to mean information about the shape, location, and/or size of the surfaces, in addition to information about their specific orientations and the like. Other features of the surfaces may also be indicated in the information as appropriate, such as colour information, reflectivity information, or object identifiers.

The BVH structure, as noted above, may take any suitable form.

In some embodiments, the BVH structure comprises a plurality of BVHs each corresponding to surfaces of a respective orientation or range of orientations, and the BVH selection unit is operable to discard one or more BVHs. Such a structure is illustrated by FIG. 8, for example.

In some embodiments, the BVH structure comprises a single BVH with a plurality of nodes each corresponding to surfaces of a respective orientation or range of orientations, and the BVH selection unit is operable to discard one or more nodes of the BVH. Such a structure is illustrated by FIG. 9, for example.

In some embodiments, the BVH structure comprises a plurality of BVHs each corresponding to surfaces of a respective orientation or range of orientations, wherein two or more of the plurality of BVHs share one or more nodes, and the BVH selection unit is operable to discard one or more BVHs. Such a structure is illustrated by FIG. 10, for example.

As noted above, the BVH structure may comprise any suitable information about the surfaces. In some embodiments, the BVH structure comprises information identifying a grouping of the surfaces in dependence upon the surface orientation—this can include both the identification of the groups (and associated parameters, such as the orientation associated with the groups) as well as the assignment of surfaces to those groups. In some cases, each of the groups corresponds to a face of a three-dimensional shape (although of course other shapes may be considered, such as in two-dimensional implementations), and each surface is assigned to group corresponding to the face that has a surface normal that most closely approximates that of the surface. As is discussed with reference to FIG. 4, in some embodiments it may be considered suitable that the three-dimensional shape is a cube, although in other cases other shapes may be more appropriate.

The BVH selection unit 1110 is operable to discard one or more elements of the BVH structure in dependence upon a direction of an incident ray; that is, the BVH selection unit 1110 is operable to determine a group of BVH elements to be used for raytracing in dependence upon the direction of the incident ray.

In other words, the BVH selection unit 1110 is operable to determine which parts of the BVH structure are to be used for the raytracing process (or at least the portion of the process being performed at that time, such as the process associated with rendering a single image frame or the like). Elements may refer to individual BVHs that form a group of BVHs that is referred to as the BVH structure, and/or nodes of a BVH as appropriate.

The selection process may be performed in any suitable manner. In some embodiments, the BVH selection unit 1110 is operable to discard one or more BVH elements that correspond to surfaces of an orientation that shares at least a first vector component sign as the incident ray.

In some embodiments, the discarding process may result in the discard of all elements of the BVH structure that are not necessary for the performing of the ray tracing process. For instance, all nodes of the BVH except those which are to be utilised may be discarded, or all BVHs that do not comprise nodes for surfaces of a specific orientation may be discarded. That is to say, the discarding of elements of the BVH structure may be performed so as to reduce the number of nodes that are considered to any suitable extent.

For instance, in the example of FIG. 8 this may lead to the discarding of any one or more of the BVHs 800; a similar discarding may be performed in respect of the embodiment discussed with reference to FIG. 9 and the BVHs 910. In the embodiment of FIG. 10, any number (such as five, although any other number may be suitable) of the BVH structures 1000 (and corresponding non-utilised BVHs 1010) may be discarded.

The raytracing unit 1120 is operable to perform a raytracing process using the remaining BVH elements. As noted above, the raytracing process may form part of a general image rendering process, such as for a computer game or a video.

The arrangement of FIG. 11 is an example of a processor (for example, a GPU and/or CPU located in a games console or any other computing device) that is operable to perform a raytracing process (for example, as part of an image rendering function), and in particular is operable to:

identify a BVH structure for use in generating images of a virtual environment, the BVH structure comprising information about one or more surfaces within the virtual environment;

discard one or more elements of the BVH structure in dependence upon a direction of an incident ray; and perform a raytracing process using the remaining BVH elements.

Figure 12:
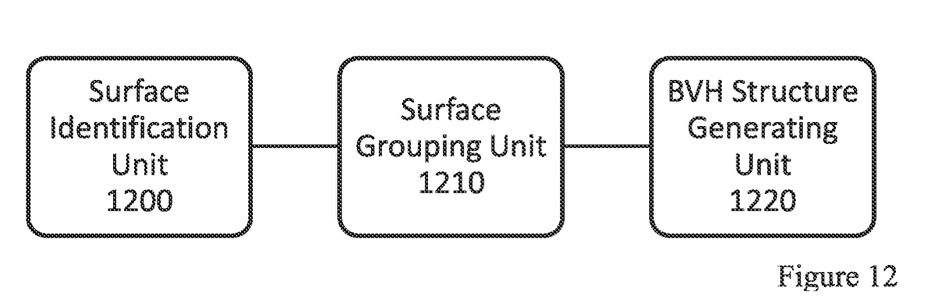
FIG. 12 schematically illustrates a system for generating a BVH for use in a raytracing process.

FIG. 12 schematically illustrates a system for generating a BVH for use in a raytracing process. The system comprises a surface identification unit 1200, a surface grouping unit 1210, and a BVH structure generating unit 1220. This system may be implemented in a content creation system, for example, such as a computer that is used to design virtual environments or to generate them from input real-world environment information.

The surface identification unit 1200 is operable to identify one or more surfaces within a virtual environment. This identification may comprise the determination of any suitable information about the surfaces in the environment—for example, orientation, size, shape, colour, reflectivity, or an identification of the object to which the surface belongs. While reference is made here to a virtual environment, it is envisaged that the same techniques may be applied to images or videos of a real environment as part of the generation process for a virtual environment.

The surface grouping unit 1210 is operable to generate one or more groups of surfaces in dependence upon an identified surface orientation. The grouping process may be implemented in line with any of the above examples, or indeed any suitable process. For instance, the grouping process may comprise identifying a representative orientation for each group (such as determining the surface normal direction for each face of a unit cube), and then assigning each identified surface to one or more groups that have a most similar (or suitably similar) surface normal.

As is apparent from this discussion, surfaces may be assigned to more than one group where appropriate. For example, if two groups are equally (or substantially equally) appropriate (for example, the surface normal of each group is within a threshold difference of the surface normal of the surface being assigned) then the surface may be placed in both groups. While this of course increases the size of the BVH structure due to repetition, it may result in a more efficient BVH structure traversal when implemented in a suitable fashion. For example, but allowing the groups to effectively overlap, it may be possible to utilise a smaller number of BVHs or BVH nodes in at least some use cases.

The BVH structure generating unit 1220 is operable to generate a BVH in dependence upon the generated grouping, wherein the BVH structure comprises one or more elements and information about the one or more surfaces.

The arrangement of FIG. 12 is an example of a processor (for example, a GPU and/or CPU located in a games console or any other computing device) that is operable to generate a BVH for use in a raytracing process, and in particular is operable to:

identify one or more surfaces within a virtual environment;

generate one or more groups of surfaces in dependence upon an identified surface orientation; and generate a BVH in dependence upon the generated grouping, wherein the BVH structure comprises one or more elements and information about the one or more surfaces.

Figure 13:
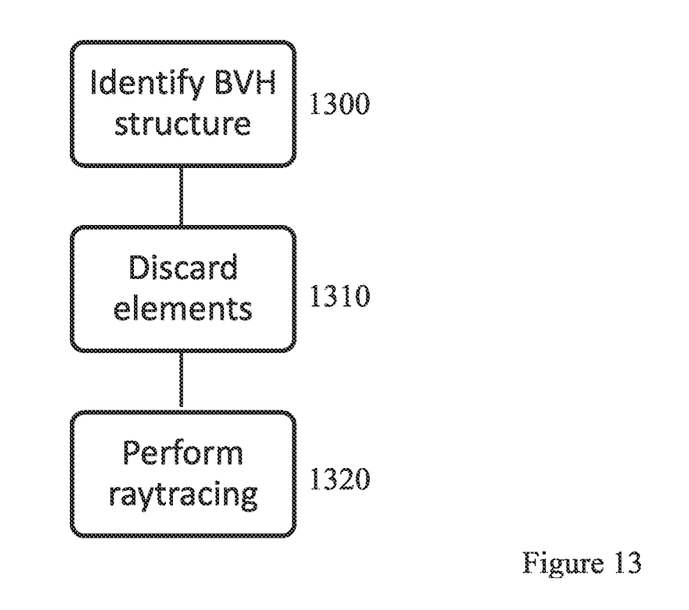
FIG. 13 schematically illustrates a method for performing a raytracing process.

FIG. 13 schematically illustrates a method for performing a raytracing process, which may be implemented using the arrangement of FIG. 11 for example. This method may form a part of an image rendering process, in some embodiments.

A step 1300 comprises identifying a bounding volume hierarchy, BVH, structure for use in generating images of a virtual environment, the BVH structure comprising information about one or more surfaces within the virtual environment.

A step 1310 comprises discarding one or more elements of the BVH structure in dependence upon a direction of an incident ray.

A step 1320 comprises performing a raytracing process using the remaining BVH elements.

Figure 14:
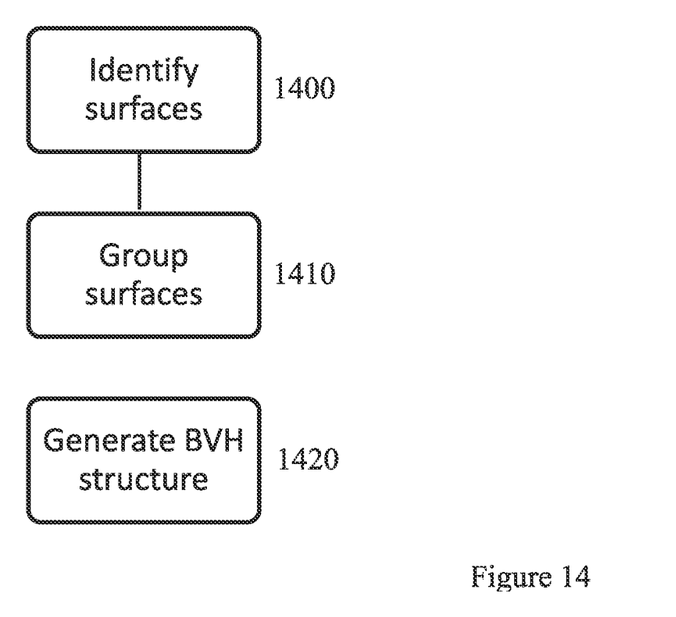
FIG. 14 schematically illustrates a method for generating a BVH for use in a raytracing process.

FIG. 14 schematically illustrates a method for generating a BVH for use in a raytracing process. The method of FIG. 14 may be implemented using the arrangement of FIG. 11, for example.

A step 1400 comprises identifying one or more surfaces within a virtual environment.

A step 1410 comprises generating one or more groups of surfaces in dependence upon an identified surface orientation.

A step 1420 comprises generating a BVH in dependence upon the generated grouping, wherein the BVH structure comprises one or more elements, and information about the one or more surfaces.

As described above, embodiments of the present disclosure may enable a more efficient BVH structure to be generated, in that the traversal of the generated BVH structure may have a reduced cost. Such a reduction in the cost of the traversal process may lead to a more responsive image rendering time, by virtue of a reduction in the raytracing process time, or the enabling of the generation of higher-quality images without a substantial increase of the associated processing costs.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for performing a raytracing process, the system comprising:

a bounding volume hierarchy, BVH, identification unit operable to identify a BVH structure for use in generating images of a virtual environment, the BVH structure comprising information about one or more surfaces within the virtual environment, the information including information identifying a grouping of the one or more surfaces in dependence upon one or more surface orientations;

a BVH selection unit operable to discard, prior to a traversal of the BVH structure, one or more elements of the BVH structure in dependence upon a direction of an incident ray; and a raytracing unit operable to perform a raytracing process using the remaining BVH elements, wherein:

the BVH selection unit is operable to discard one or more BVH elements that correspond to surfaces of an orientation that shares at least a first vector component sign as the incident ray, each of one or more groups resulting from the grouping of the one or more surfaces corresponds to a face of a three-dimensional shape, and each surface is assigned to group corresponding to the face that has a surface normal that most closely approximates that of the surface.

2. The system of claim 1, wherein:

the BVH structure comprises a single BVH with a plurality of nodes each corresponding to surfaces of a respective orientation or range of orientations, and the BVH selection unit is operable to discard one or more nodes of the BVH.

3. The system of claim 1, wherein:

the BVH structure comprises a plurality of BVHs each corresponding to surfaces of a respective orientation or range of orientations, and the BVH selection unit is operable to discard one or more BVHs.

4. The system of claim 3, wherein two or more of the plurality of BVHs share one or more nodes.

5. The system of claim 1, wherein the BVH selection unit is operable to determine a group of BVH elements to be used for raytracing in dependence upon the direction of the incident ray.

6. The system of claim 1, wherein the three-dimensional shape is a cube.

7. A system for generating a bounding volume hierarchy, BVH, structure for use in a raytracing process, the system comprising:

a surface identification unit operable to identify one or more surfaces within a virtual environment;

a surface grouping unit operable to generate one or more groups of surfaces in dependence upon an identified surface orientation; and a BVH structure generating unit operable to generate the BVH in dependence upon the generated grouping, wherein:

the BVH structure comprises one or more elements, and information about the one or more surfaces, the information including information identifying a grouping of the one or more surfaces in dependence upon one or more surface orientations, each of one or more groups resulting from the grouping of the one or more surfaces corresponds to a face of a three-dimensional shape, and each surface is assigned to group corresponding to the face that has a surface normal that most closely approximates that of the surface.

8. A method for generating images, the method comprising:

identifying a bounding volume hierarchy, BVH, structure for use in generating images of a virtual environment, the BVH structure comprising information about one or more surfaces within the virtual environment, the information including information identifying a grouping of the one or more surfaces in dependence upon one or more surface orientations;

discarding, prior to a traversal of the BVH structure, one or more elements of the BVH structure in dependence upon a direction of an incident ray; and performing a raytracing process using the remaining BVH elements, wherein:

each of one or more groups resulting from the grouping of the one or more surfaces corresponds to a face of a three-dimensional shape, and each surface is assigned to group corresponding to the face that has a surface normal that most closely approximates that of the surface.

9. A method for generating a bounding volume hierarchy, BVH, structure for use in a raytracing process, the method comprising:

identifying one or more surfaces within a virtual environment;

generating one or more groups of surfaces in dependence upon an identified surface orientation; and generating the BVH in dependence upon the generated grouping, wherein:

the BVH structure comprises one or more elements, and information about the one or more surfaces, the information including information identifying a grouping of the one or more surfaces in dependence upon one or more surface orientations, each of one or more groups resulting from the grouping of the one or more surfaces corresponds to a face of a three-dimensional shape, and each surface is assigned to group corresponding to the face that has a surface normal that most closely approximates that of the surface.

10. A non-transitory machine-readable storage medium which stores computer software which, when executed by a computer, causes the computer to perform a method for generating a bounding volume hierarchy, BVH, structure for use in a raytracing process, the method comprising:

identifying one or more surfaces within a virtual environment;

generating one or more groups of surfaces in dependence upon an identified surface orientation; and generating the BVH in dependence upon the generated grouping, wherein:

the BVH structure comprises one or more elements, and information about the one or more surfaces, the information including information identifying a grouping of the one or more surfaces in dependence upon one or more surface orientations, each of one or more groups resulting from the grouping of the one or more surfaces corresponds to a face of a three-dimensional shape, and each surface is assigned to group corresponding to the face that has a surface normal that most closely approximates that of the surface.

* * * * *